H. A. BENEDICT AND E. M. MOLLER.
CONTROL APPARATUS.
APPLICATION FILED NOV. 4, 1921.

1,436,334.

Patented Nov. 21, 1922.

WITNESSES:
H. B. Funk
W. R. Coley

INVENTORS
Hershel A. Benedict &
Edward M. Moller.
BY
Wesley G. Carr
ATTORNEY

H. A. BENEDICT AND E. M. MOLLER.
CONTROL APPARATUS.
APPLICATION FILED NOV. 4, 1921.

1,436,334.

Patented Nov. 21, 1922.
5 SHEETS—SHEET 2.

WITNESSES:
H. B. Funk.
W. R. Coley

INVENTORS
Hershel A. Benedict &
Edvard M. Moller.
BY
Wesley G. Carr
ATTORNEY

Patented Nov. 21, 1922.

1,436,334

UNITED STATES PATENT OFFICE.

HERSHEL A. BENEDICT, OF EAST ORANGE, AND EDVARD M. MOLLER, OF JERSEY CITY, NEW JERSEY.

CONTROL APPARATUS.

Application filed November 4 1921. Serial No. 512,934.

*To all whom it may concern:*

Be it known that we, HERSHEL A. BENEDICT, a citizen of the United States, and a resident of East Orange, in the county of Essex and State of New Jersey, and EDVARD M. MOLLER, a citizen of the United States, and a resident of Jersey City, in the county of Hudson and State of New Jersey, have invented a new and useful Improvement in Control Apparatus, of which the following is a specification.

Our invention relates to control apparatus for governing the operation of electric railway vehicles and the like, and it has special relation to controller structures for pneumatically governing certain car operations.

One object of our invention is to provide, in combination with a car-propelling motor and a car brake, an adjustable foot-operated device for pneumatically effecting the closure of the motor circuit and for varying the effect of the brake.

Another object of our invention is to provide an adjustable foot valve for pneumatically effecting the closure of a motor circuit, varying the effect of a car brake and operating a car door.

A further object of our invention is to provide a foot valve of the above-indicated character wherein the pedal or lever member may be readily attached and detached by means of an automatic latching arrangement.

A further object of our invention is to provide a novel foot-valve structure whereby movement of an operating member in a plane transverse to the plane of rotation of the valve disk effects the desired rotative movement thereof.

Other objects of our invention will become evident from the following detailed description taken in conjunction with the accompanying drawings wherein.

Figure 11:
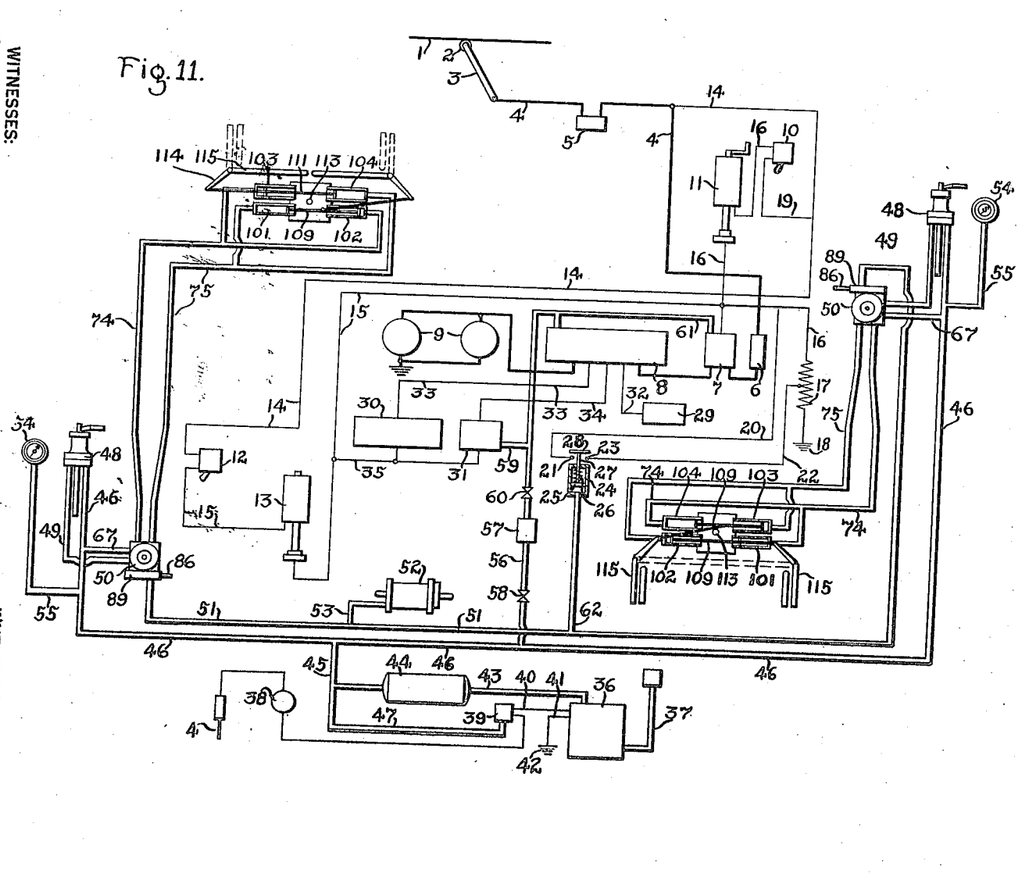
Fig. 11 is a diagrammatic view of a control system embodying the principles of our invention.

Our invention is particularly adapted for use in the system shown in Fig. 11, as set forth in our copending application, Serial No. 512,924, filed Nov. 4, 1921, although our invention is not so limited in its application.

Referring first to Fig. 11, of the drawings, in which is shown diagrammatically a general arrangement of electrical instrumentalities for starting and operating the car and a similar arrangement of pneumatic instrumentalities for "braking" the car, and also novel means for opening and closing the platform-door or doors and, at the same time, controlling the stopping and starting movements of the car, the reference character 1 indicates the main trolley-wire, with which is in rolling contact any usual construction of trolley-wheel as 2, carried by a pole 3 with which is connected, in the usual manner, a main-circuit conductor 4.

Inserted in this circuit, in the usual and well-known manner, are a fuse-box 5, a main switch 6, a line switch 7, a switch-group 8 and the usual electric motor or motors 9, 9. In the accompanying diagram, as represented in Fig. 11, the system is shown as used with the two end-platforms of a car, so that the car can be operated from either end, and, in that case, a control switch 10 and a controller 11 are located upon one platform, while a control-switch 12 and a controller 13 are positioned upon the other platform of the car.

Connected with the main conductor 4, is an auxiliary conductor 14, leading to the control switch 12, while, extending from said control switch 12, are conductors 15, with which is connected the previously mentioned controller 13. One of the conductors 15 is connected, through a conductor 16, to a control resistor 17 which is grounded, as at 18, to provide a complete circuit.

Also connected with the main conductor 4 is an auxiliary conductor 19 leading to the control switch 10, and extending from said control switch 10 is the above-mentioned conductor 16 with which is connected the previously-mentioned controller 11 through which the circuit is completed to the control resistor 17 and the ground 18, as will be clearly understood. Leading from one of the conductors 15 is a conductor 20 which terminates in a contact member 21, while connected with the control resistor 17, is a motor-control conductor 22 attached, at its opposite end, to a contact member 23.

A pneumatic relay comprises a cylinder 24 in which is disposed a piston or plunger 25 that is biased by a spring 26 to cause a member 28, carried by the piston rod 27, to make contact with the stationary contact members 21 and 23. In connection with the electrical instrumentalities and the electrical circuits hereinabove described, we have shown the arrangement of the usual starting resistor 29, the sequence switch 30, and the reverser 31, as well as the arrangement of the conductor 32, leading from the switch-group 8 to the resistor 29, the conductor 33 leading from the switch-group 8 to the sequence switch 30, and the conductor 34 leading from the switch-group 8 to the reverser 31, the electrical circuit being completed from one of the conductors 15 with the sequence switch 30 and the reverser 31 by means of the conductor 35, as indicated in Fig. 11.

Having, in the foregoing in a general manner, set forth the general arrangement of the electrical instrumentalities, we will now set forth the general arrangement of the pneumatic instrumentalities and their pipe-connections.

An air-compressor 36 is provided with an air-intake 37 and is electrically operated, from the main conductor 4, by means of a switch 38 and an electric governor 39, a conductor 40 leading to the mechanism of the air-compressor 36, and a conductor 41, which is grounded as at 42, completing the power-serving circuit for the air-compressor. Connected with, and leading from, the air-compressor 36 is a pipe 43 for conveying and forcing the compressed air into the air-receiving tank or reservoir 44. Leading out of said reservoir 44 is a pipe 45 with which is connected the main line of piping 46, termed the reservoir line. The governor 39 is controlled by the air-pressure within the tank or reservoir 44 through a pipe 47 placed between the pipe 45 and the governor 39, as shown.

Connected with the respective ends of the piping 46 are the usual brake-valves, as 48. Air conveying pipes 49 are connected to suitably constructed foot-valves 50, through which the compressed air is adapted to be passed into a line of pipe 51, known as the train line, for actuating the brake-mechanism of the usual brake cylinders 52, connected with said train line by the piping 53. Air gages 54 may be connected to a reservoir line 46 by the pipes 55, in the manner shown.

Connected with, and leading from, the reservoir line 46 is a pipe 56 which is connected to a control-reservoir 57, and a cutout cock 58 is located in the pipe 56. Leading from said control-reservoir 57 is a pipe 59 in which may be placed a strainer 60 for conveying the compressed air to the mechanism of the reverser 31. Furthermore, there is connected with said pipe 59 another pipe 61 for conveying the compressed air to the mechanism of the switch-group 8 and the line switch 7, in a manner as indicated in Fig. 11. To pneumatically operate the piston or plunger 25 of the hereinbefore mentioned pneumatic relay, so as to break the electrical circuit between the contacts 21 and 23 and the member 28 carried by the piston rod 27, an air-conveying pipe 62 is disposed between the train line 51 and the end of the cylinder 24 of the pneumatic relay, as shown.

Figure 1:
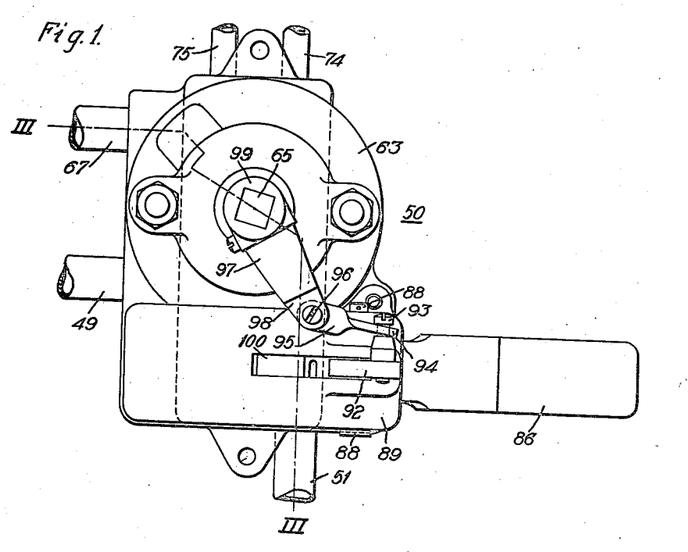
Fig. 1 and Fig. 2 are views in plan and in side elevation, respectively, of a foot valve constructed in accordance with our present invention.
Figure 2:
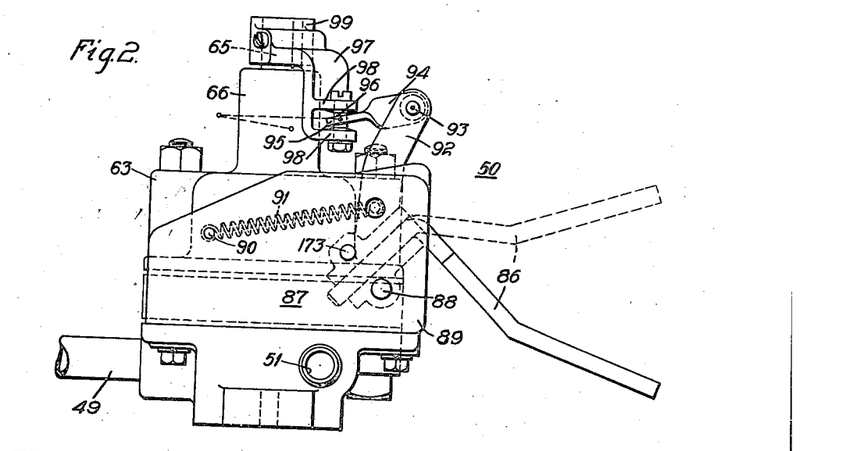
Figure 3:
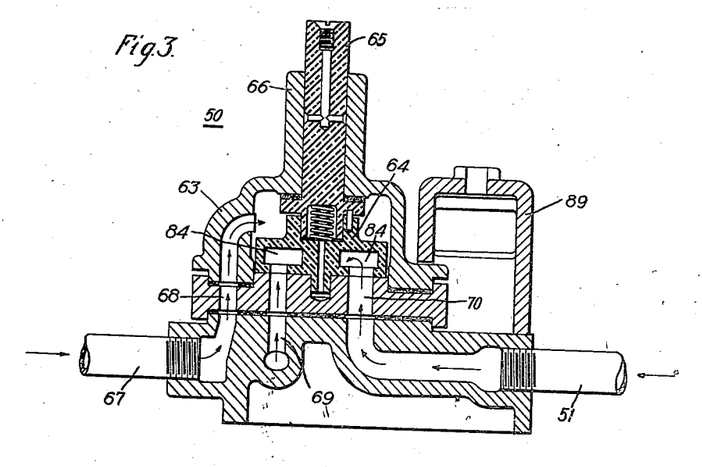
Fig. 3 and Fig. 4 are longitudinal sectional views taken along the line III—III of Fig. 1 under different operating conditions.
Figure 4:
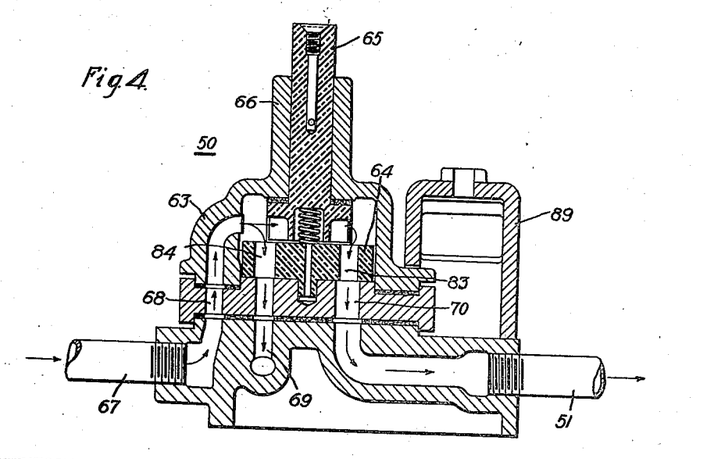

Referring to Fig. 1 and Fig. 2, the structure here shown comprises a shell or casing 63 within which a rotary valve disk 64 is adapted to be operated by means of a foot lever or pedal 86. The disk 64 is rigidly mounted upon a spindle or rod 65, which is journaled in a suitably formed bearing portion or member 66. A pipe 67 connects a reservoir line 46 with an inlet to each shell or casing 63 for a purpose to be set forth.

Another pipe 49 communicates with the usual engineer's valve (not shown), while a pipe 51 is connected to a brake-cylinder of any well-known construction.

Figure 9:
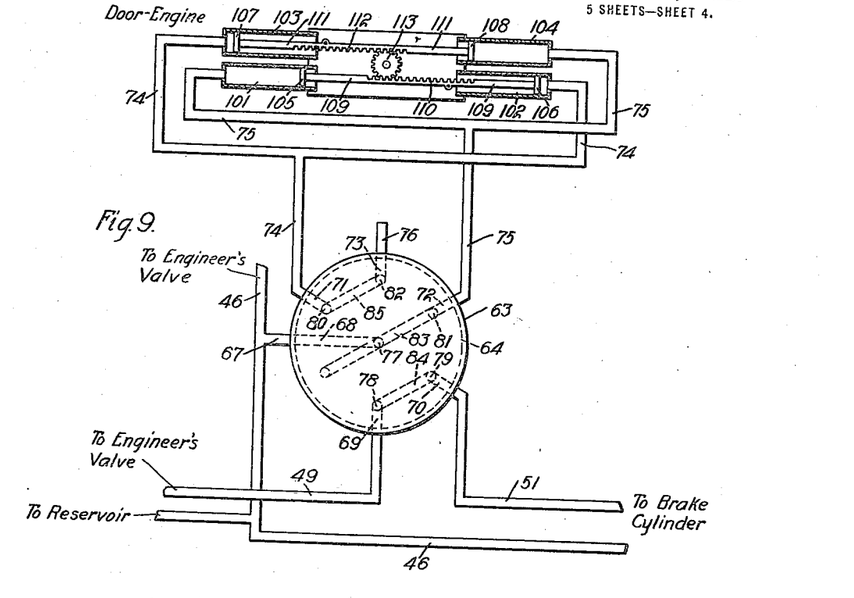
Fig. 9 and Fig. 10 are diagrammatic views illustrating the pneumatic connections that are effected in the different positions of the rotary valve.
Figure 10:
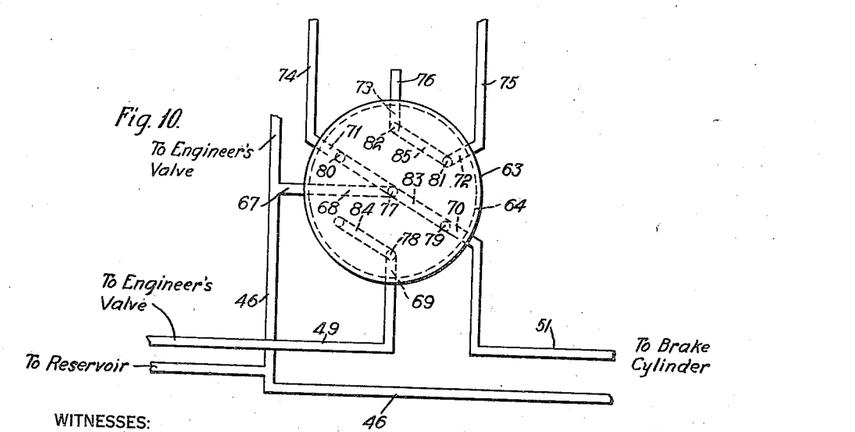

As indicated in the diagrammatic views shown in Fig. 9 and Fig. 10 of the drawings, the fixed or stationary portion of each shell or casing 63 is provided with ducts designated as 68 to 73, inclusive, the pipe 67 being connected to the duct 68, pipe 49 to the duct 69 and pipe 51 to the duct 70. Similarly, the duct 71 communicates with a pipe 74, duct 72 with a pipe 75 and duct 73 with a pipe 76, as more fully hereinafter set forth. In communication with the respective stationary or fixed ducts 68 to 73, inclusive, are connecting duct portions 77 to 82, inclusive, said duct portions being adapted to establish communication with ducts 83, 84 and 85 in the valve disk 64, according as the valve disk occupies the positions represented in Fig. 9 or in Fig. 10.

The pedal 86 is detachably mounted in a socket member 87 within the casing 63, the socket member being provided with a pivot 88 which extends across a portion 89 of the casing. The portion 89 is also provided with a pin or stud 90, and attached to that part of the stud within the casing portion 89 is one end of a spring 91. The spring is attached, at its other end, to the socket portion 87 for receiving the foot lever or pedal 86.

Pivotally connected, by means of a pin 93, to a portion 92 of the lever or pedal, which is movably disposed in an opening, such as 100, in the casing portion 89, is a link 94, the link being operatively connected, at its end portion 95, to a pivotal member 96. The member 96 is secured between the arms of a bifurcated end portion 98 of a crank 97, the crank being suitably connected by means of a socket portion 99 with the end of the valve spindle 65.

From an inspection of Figs. 1 and 2, it will be seen that translatory movements of the foot lever or pedal in a vertical plane are transformed, by means of the above-described parts, into horizontal reciprocatory movements of the crank 97, so that the downward movement of the lever or pedal 86, when depressed by the foot of the motorman, causes the valve disk 64 and the various ducts to assume the relative positions that are indicated in Fig. 9 of the drawings; but, when the foot pressure is removed from the lever or pedal 86, the spring 91 causes the lever or pedal to assume the dotted-line position that is shown in Fig. 2 and thus causes the valve disk 64 and the various ducts to assume the relative positions that are represented in Fig. 10 of the drawings.

Figure 5:
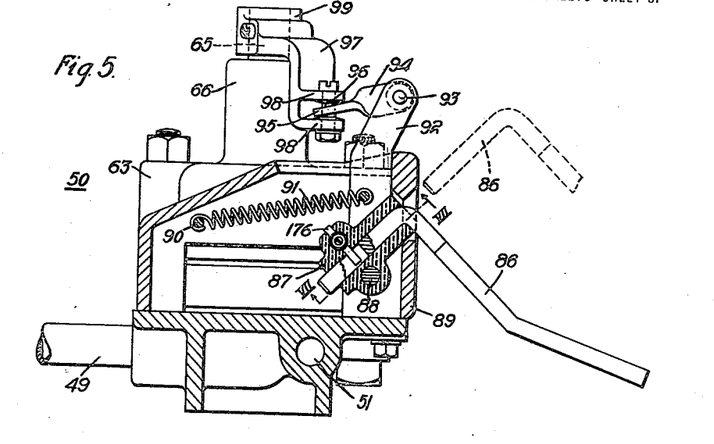
Fig. 5 and Fig. 6 are views, partially in elevation and partially in section, of the valve structure that is shown in Fig. 1 and Fig. 2.
Figure 6:
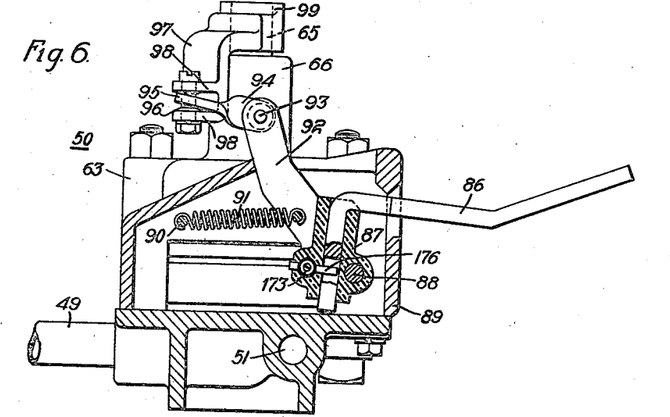

The pedal or foot-operated apparatus, which is shown in detail in Figs. 5 to 8, inclusive, embodies a structure whereby the pedal proper 86 may be locked in place, except when the pedal occupies a predetermined position, namely, that corresponding to full running position, which is shown in Figs. 2 and 5.

The bent end-portion 170 of the pedal 86 is located within the pivotally-mounted socket member 87, normally occupying the position with respect to the member 87 that is shown in Figs. 2, 5, 6 and 8. Under this condition, the narrow end 172 of a wedge-shaped slot 171 in the end-portion 170 encloses a pin 176 that is securely fastened to a larger pin or rod 173 which is adapted to slide in one portion of the socket member 87 and, under certain conditions, project into an opening 174 in one wall of the casing portion 89. To permit free movement of the pin 176, a slot 175 in one internal wall of the socket member 87 is provided, as clearly shown in Figs. 7 and 8.

Figure 7:
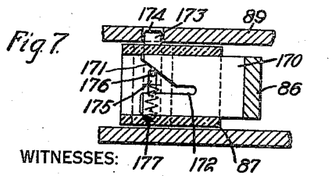
Fig. 7 and Fig. 8 are fragmentary sectional views taken along the line VII—VII of Fig. 5, with the parts occupying different positions.

A helical spring 177 is adapted to bias the rod 173 toward the locking position that is shown in Fig. 7, that is, to force the pin 173 into the opening 174.

Assuming that the pedal 86 has been removed and that it is desired to replace it, the socket member 87 already occupies the position shown in Figs. 5 and 7, in which its internal opening is in substantial alinement with the upper wall of the corresponding opening in the casing portion 89. The socket member 87 is maintained in this position, in opposition to the action of the biasing spring 91, by reason of the insertion of the pin 173 in the opening 174, the pin being biased to this locking position by reason of the action of the coil spring 177.

Figure 8:
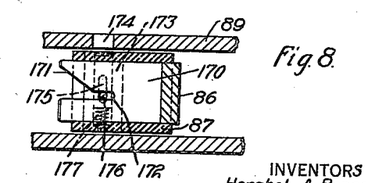

Upon inserting the pedal 86 in the socket member 87, the wide mouth of the wedge-shaped slot 171 first engages the small pin 176 and, as the pedal is pressed home, the pin 176 is gradually forced to travel along the slot 175, by means of the inclined edge of the slot 171, until, in the final position of the pedal 86, the pin 175 rests within the narrow portion 172 of the slot, as clearly indicated in Fig. 8.

In this way, the pin 173 is removed from its locking engagement with the casing portion 89, and normal movement of the pedal member 86 is permissible.

To remove the pedal 86, it must be first actuated to its lowermost position, which is illustrated in Fig. 5, whereupon, an outward pull upon the pedal releases the end portion 170 from engagement with the pin 176, as the pedal gradually leaves the socket member 87, while, at the same time, the spring 177 forces the rod 173 into the opening 174. Consequently, when the pedal 86 has been removed, the socket member 87 remains in the position illustrated in Fig. 5, by reason of the locking action of the rod 173.

The door-operating mechanism for pneumatically opening and closing the platform doors of the car may be of any well known type and one form is diagrammatically shown in Fig. 9 and Fig. 11. This mechanism comprises four cylinders 101 to 104, inclusive, which are respectively provided with pistons or plungers 105 to 108, inclusive. As shown, these cylinders were arranged in pairs, the cylinder 101 being disposed opposite the cylinder 102, and the cylinder 103 being located opposite the cylinder 104. The pistons 105 and 106 are interconnected by a rod 109 that is provided with a rack portion 110, while the pistons 107 and 108 are likewise interconnected by a rod 111, which is also provided with a rack portion 112. The rack portions 110 and 112 mesh with the teeth of a pinion 113, constituting part of the mechanism for actuating any suitable link or other mechanism to effect the opening and closing of the usual car door.

It will be noted that, in the position of the foot-valve that is illustrated in Fig. 9, the pipe 49 from the engineer's valve is connected, through duct 84 in the rotary disk 64, to the train-line pipe 51. Consequently, whenever the foot-valve 50 is maintained in its lowermost or running position, the control of the air-brake by the engineer's valve may be accomplished in the usual manner, there being absolutely no interference on the part of the foot-valve 50.

Furthermore, the cylinders 102 and 103 of the door-operating mechanism, which correspond to the opening movement of the door, are connected, through the pipe 74 and duct 85 of the valve disk 64, to the exhaust pipe 76. At the same time, the supply or inlet pipe 67 is connected through ducts 68 and 83 to pipe 75, whereby air pressure is admitted to the closing cylinders 101 and 104 of the door-operating mechanism to maintain the door closed.

When the pedal 86 reaches its uppermost or emergency position, the rotary valve disk 64 occupies the position shown in Fig. 10. Under such conditions, full air pressure is admitted from the supply pipe 67, through ducts 68 and 83, to the train-line pipe 51 and, thus, to the usual brake-cylinder.

Furthermore, at this time, the duct 83 occupies a position that is adapted to permit full fluid pressure to enter the pipe 74, whereby such pressure is admitted to the opening cylinders 103 and 102 of the door-operating mechanism. At the same instant, the duct 85 effects communication between the pipe 75 and the exhaust pipe 76. Consequently, the car door is opened at approximately the same time that full pressure is exerted by the brake mechanism.

If the motorman slightly lifts his foot, the pipe 49 connecting with the engineer's valve 48 is blanked off, since the duct 84 no longer communicates with the train-line pipe 51. Consequently, by suitable proportioning and positioning of the duct 83 with respect to the duct 85, an adjustable degree of air pressure may be admitted to the train-line pipe 51 from the inlet pipe 67 through the ducts 68 and 83. In this way, operation of the foot-valve 50, corresponding to the ordinary movement of the engineer's valve from the "service" to the "lap" position, may be accomplished by an up-and-down movement of the operator's foot to successively admit a predetermined degree of air pressure into the train-line pipe 51 and then completely shut off the train-line pipe to cause the brake cylinder to retain such pressure.

Having, in the foregoing description, set forth the general arrangements and combinations of devices and parts for locking the doors in their closed relation before the car or bus can be operated, and after the doors have closed permitting the operation of the car; and, furthermore, for opening the doors automatically after the car has been started, we will now briefly set forth the manner of producing these results.

Let us suppose that the car is about to be started and that the doors are in their open positions. One method of operation is as follows:

The motorman, just prior to operating the controller 11 or the controller 13, to turn on the electric current, depresses the foot-lever or pedal 86 of the corresponding foot valve 50. Immediately the valve disk 64 is brought into position indicated in Fig. 9 and the compressed air passes from the tank or reservoir 44, through the pipe 45, into the reservoir line or pipe 46, and thence, by means of the pipe 67, through the registering ducts 68, 77, 83, 81 and 72, into and through the piping 75, and thence into the ends of the cylinders 101 and 104, so that the pistons 105 and 108 are moved forward into the positions shown in said Fig. 9, whereby the doors are positively closed, the previously intaken air in the cylinders 102 and 103 being exhausted through the piping 74, the registering ducts 71, 80, 85, 82 and 73, into and from the exhaust pipe 76.

At the same time, the motorman, by operating and closing the brake valve 48, shuts off the air pressure through the pipes 49 and 51, thus removing any air pressure against the piston 25 and the relay cylinder 24, whereupon the spring 26 becomes active, and an electrical contact is established between the bar or member 28 and the contacts 21 and 23. An uninterrupted electric circuit thus being established as soon as the controller 11 or the controller 13 has been moved to any operative position, the car is electrically propelled, in the usual manner.

When it is desired to stop the car, the brake valve 48 is opened so that the compressed air from the line of piping 46 will pass through said valve 48, into the pipe 49 and through the registering valves 69, 78, 84, 79 and 70 (see Fig. 9) into the train line or piping 51, and, by means of the pipe 53, actuating the piston in the brake cylinder 52 to set the brakes; the air pressure, at the same time, by means of the pipe 62, actuating the relay piston 25 to break the electrical circuit through the bar or member 27 and the contacts 21 and 23, thus shutting off the electricity to the propelling or driving mechanism of the car, as will be understood.

The car now having been stopped, the motorman removes his foot from the foot-lever or pedal 86, whereupon the spring moves the pedal into the dotted-line position shown in Fig. 2, and whereby the valve disk 64 is rotated into the position indicated in Fig. 10 of the drawings.

The compressed air, coming through the reservoir line or pipe 46 and the pipe 67, passes through the registering ducts 68, 77, 83, 80 and 71, into the piping 74, and thence into the cylinders 102 and 103, against the pistons 106 and 107, driving the latter forwardly to actuate the door-operating mechanism, thereby moving the doors into their open positions. Simultaneously, the air contained in the cylinders 101 and 104 is caused, by the moving pistons 105 and 108, to be exhausted through the piping 75 and the registering ducts 72, 81, 85, 82 and 73 into and from the exhaust pipe 76.

While the car is stopped, in order that the air may not be shut off from the brake-cylinder 52 and the relay-cylinder 24, communication between the pipes 46 and 67 and 51 is also established through the registering ducts 68, 77, 79 and 70, as will be seen from an inspection of Fig. 10 of the drawings.

To again close the doors and start the car, the first above-stated operation of closing the brake valve 48 and depressing the foot-lever or pedal 86, to bring the valve device 64 once more into the position indicated, is repeated.

We do not wish to be restricted to the specific structural details or arrangement of parts herein set forth, as various modifications thereof may be effected without departing from the spirit and scope of our invention. We desire, therefore, that only such limitations shall be imposed as are indicated in the appended claims.

We claim as our invention:

1. In a vehicle, the combination with a dynamo-electric machine and a car brake, of adjustable foot-operated means for pneumatically effecting the closure of the machine circuit and for varying the effect of said brake.

2. In a vehicle, the combination with a propelling motor and a pneumatic car brake, of an adjustable foot-valve for effecting the closure of the machine circuit and for varying the effect of said brake.

3. In a vehicle, the combination with a propelling motor and a pneumatic car brake, of an adjustable foot-valve for effecting release of said brake and the subsequent closure of the machine circuit when the valve is operated in one direction and for effecting the opening of said circuit and the subsequent adjustable application of said brake when the valve is operated in another direction.

4. In a vehicle, the combination with a dynamo-electric machine, a car brake and a car door, of adjustable foot-operated means for pneumatically effecting the closure of the machine circuit, varying the effect of said brake and operating said door.

5. In a vehicle, the combination with a dynamo-electric machine, a car brake and a car door, of an adjustable foot-valve for effecting the closure of the machine circuit, varying the effect of said brake and operating said door.

6. In a vehicle, the combination with a dynamo-electric machine, a car brake and a car door, of an adjustable foot-valve for effecting the closure of said door, the release of said brake and the subsequent closure of the machine circuit when the valve is operated in one direction and for effecting the opening of said circuit, the subsequent adjustable application of said brake and the opening of said door when the valve is operated in another direction.

7. In a vehicle, the combination with a propelling motor and a pneumatic car brake, of an adjustable foot-valve for effecting the release of said brake and the subsequent closure of the machine circuit when the valve is operated in one direction and for effecting the opening of said circuit and the subsequent adjustable application of said brake when the valve is operated in another direction, said valve being biased in the last-named direction.

8. In a vehicle, the combination with a dynamo-electric machine, a car brake and a car door, of an adjustable foot-valve for effecting the closure of said door, the release of said brake and the subsequent closure of the machine circuit when the valve is operated in one direction and for effecting the opening of said circuit, the subsequent adjustable application of said brake and the opening of said door when the valve is operated in another direction, said valve being biased in the last-named direction.

9. The combination with a frame member, of a movable member mounted thereupon, a removable operating member adapted to engage said movable member and having a slot, and a pin in said movable member normally engaging said frame member and adapted to be actuated by a wall of said slot to disengage said frame member.

10. The combination with a frame member, of a rotatable member mounted thereupon, a pin normally locking said frame member and said rotatable member, and a detachable operating member adapted to automatically wedge said pin away from said frame member.

11. The combination with a frame member, of a rotatable socket member mounted thereupon, a pin carried by said socket member and biased to lock with said frame member, and a detachable operating member having a wedge-shaped slot adapted to force said pin out of engagement with said frame member.

12. The combination with a casing, of a rotatable socket member mounted thereupon and biased towards a certain position, a pin carried by said socket member and biased to engage an opening in said casing to thereby restrain the socket member from occupying its biased position, and a detachable operating member having a wedge-shaped slot adapted to force said pin out of engagement with said casing.

13. The combinatiton with a casing having a plurality of openings, of a rotatable socket member mounted within said casing near one of said openings, a spring for biasing said socket member away from that opening, a pin carried by said socket member and biased to engage a second opening in said casing to thereby restrain the socket member in an operating position near the corresponding opening and a detachable operating member for insertion through the opening near said socket member and having a wedge-shaped slot in one end adapted to force said pin out of the corresponding opening in said casing.

14. The combination with a rotatable valve member, of means for rotating said member comprising a crank attached thereto, an operating member movable in a plane transverse to the plane of rotation of said valve member and means for interconnecting said crank and said operating member.

15. The combination with a rotatable valve member, of means for rotating said member comprising a crank attached thereto, an operating member movable in a plane substantially parallel to the axis of rotation of said valve member, and means for loosely connecting said crank to said operating member.

16. The combination with a rotatable valve member, of means for rotating said member comprising a crank attached thereto, a pedal operable in a plane substantially at right angles to the plane of rotation of said member, a member movable with said pedal and having an arm extending transversely thereto, and a link having its respective ends pivotally connected to said lever and said crank.

17. The combination with a rotatable valve member, of means for rotating said member comprising a crank attached thereto, a pedal operable in a plane substantially at right angles to the plane of rotation of said member, a member movable with said pedal and having an arm extending transversely thereto, and a link having its respective ends bent at substantially right angles the one to the other and pivotally connected to said lever and said crank.

18. The combination with a rotatable valve member and a casing therefor, of means for rotating said member comprising a crank attached thereto and having a bifurcated end, a pedal operable in a plane substantially parallel to the axis of rotation of said member, a socket member pivotally mounted upon said casing to be actuated by said pedal and having an arm extending transversely thereto and a link having its respective ends bent at substantially right angles the one to the other and pivotally connected to said lever and between the arms of the bifurcated end of said crank.

In testimony whereof, we have hereunto subscribed our names this 23 day of October, 1921.

HERSHEL A. BENEDICT.
EDVARD M. MOLLER.